United States Patent

[11] 3,608,572

[72] Inventor Hyman Hass
Stamford, Conn.
[21] Appl. No. 857,498
[22] Filed Sept. 12, 1969
[45] Patented Sept. 28, 1971
[73] Assignee Applied Fluidics, Inc.
Stamford, Conn.
Continuation-in-part of application Ser. No. 756,058, Aug. 28, 1968, now Patent No. 3,528,444.

[54] FLUIDIC DIGITAL CONTROLLER
11 Claims, 8 Drawing Figs.
[52] U.S. Cl. ................................................ 137/81.5
[51] Int. Cl. ................................................. F15c 1/12
[50] Field of Search ..................................... 137/81.5

[56] References Cited
UNITED STATES PATENTS
| | | | |
|---|---|---|---|
| 3,155,825 | 11/1964 | Boothe | 137/81.5 |
| 3,339,571 | 9/1967 | Hatch, Jr. | 137/81.5 |
| 3,423,990 | 1/1969 | Martin | 137/81.5 X |
| 3,489,181 | 1/1970 | Boothe | 137/81.5 |

Primary Examiner—William R. Cline
Attorney—Michael Ebert

ABSTRACT: A fluidic process controller for comparing a fluidic input analog pressure signal representing a set point (SP) with a fluidic input analog pressure signal representing a process variable (PV) to produce a fluidic output signal whose pressure is proportional to the error therebetween in order to govern a final control element in a direction and to an extent causing the process variable to return to the set point value. The controller includes a comparator having a trigger circuit responsive to the input signals to produce a fluidic output signal depending only on whether PV is lower or higher than SP and at a constant pressure level. This output signal is integrated to produce a control signal which is applied to the final control element. The final control element functions to vary PV in a direction reducing its difference with SP but causing PV to slightly overshoot SP before reversing direction, whereby the output signal is constituted by square wave pulses whose integrated pressure provides the control signal acting to regulate the final control element to maintain PV at the desired level.

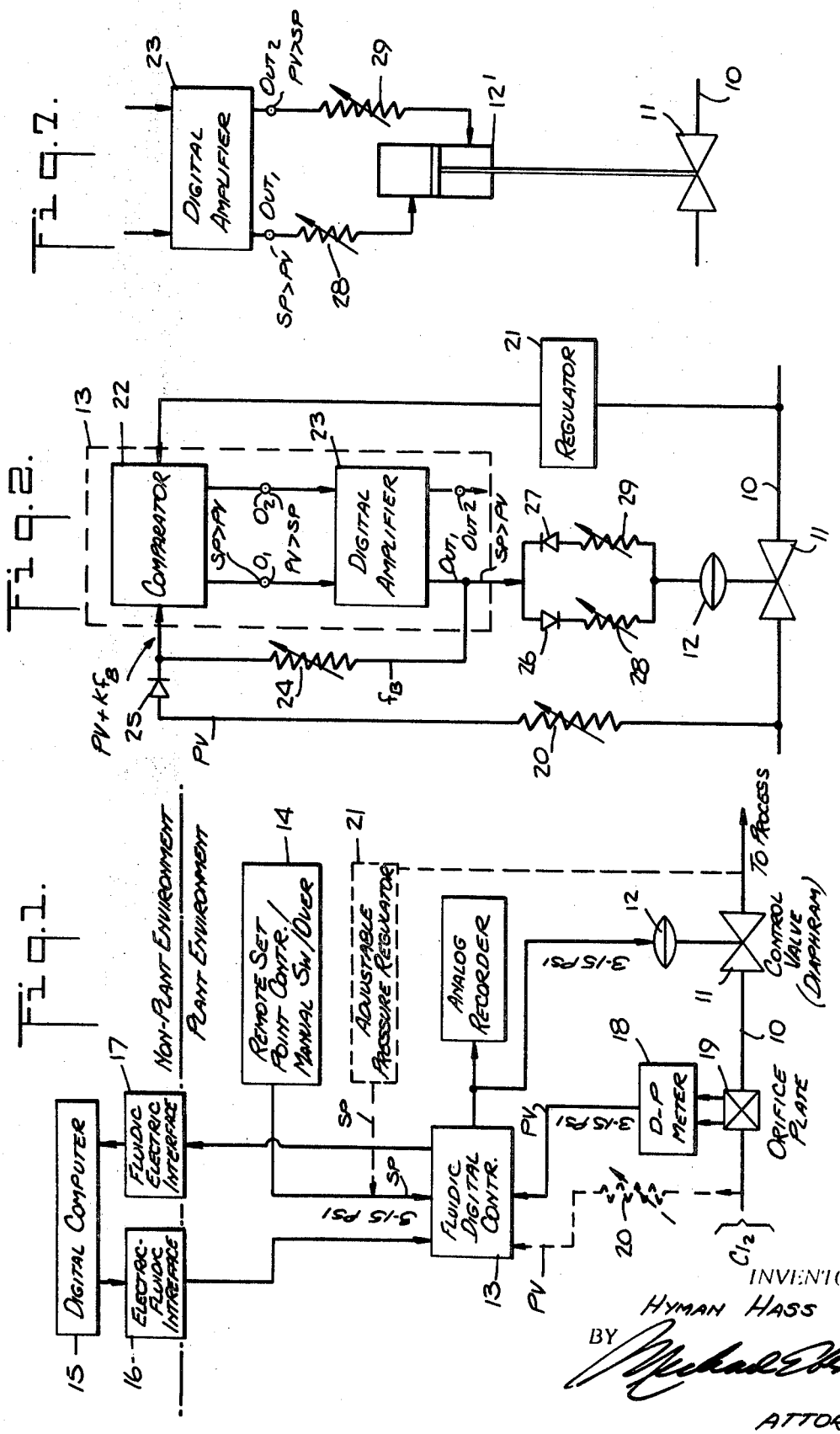

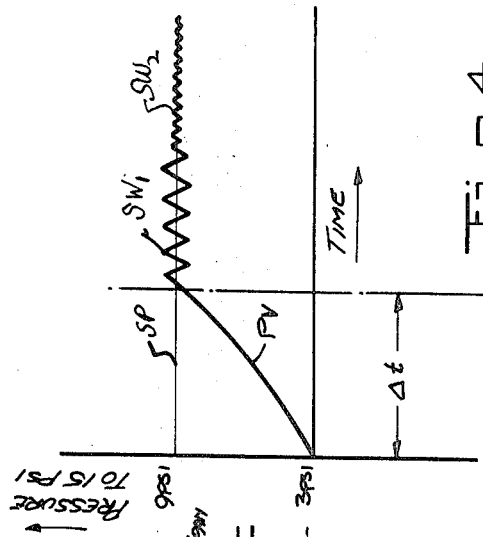
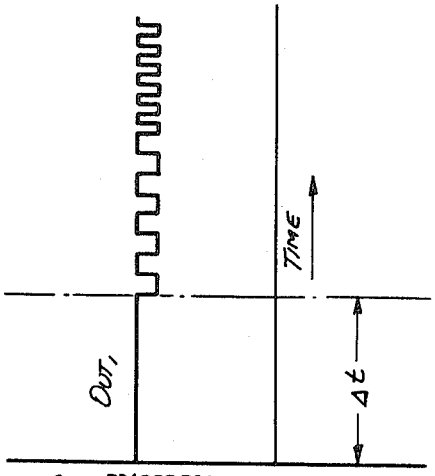
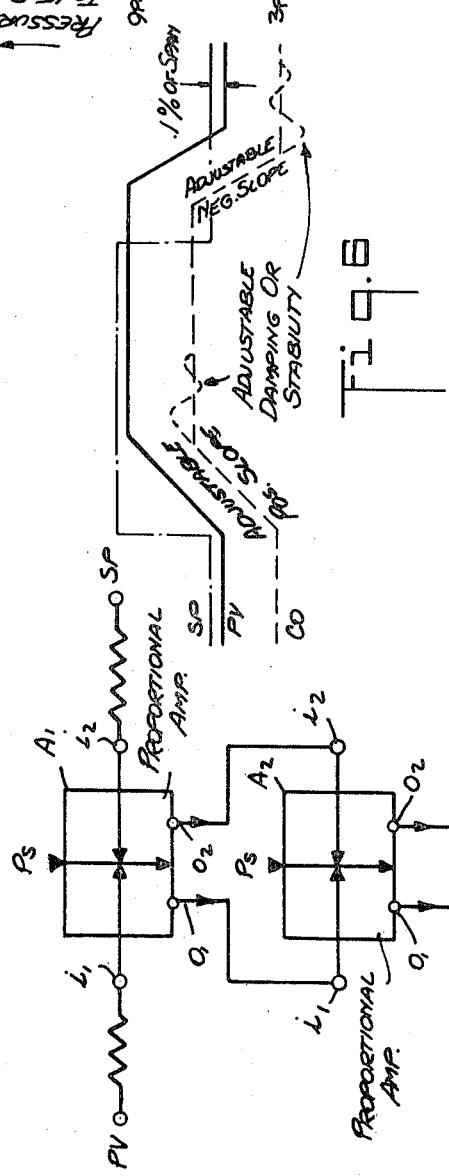
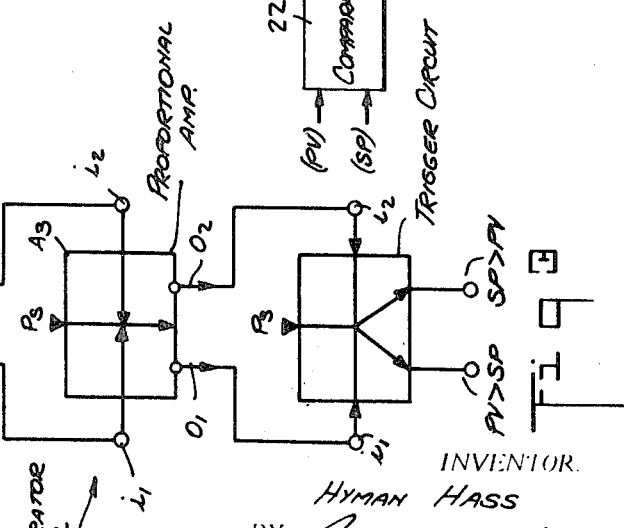

3,608,572

FLUIDIC DIGITAL CONTROLLER

RELATED CASE

This application is a continuation-in-part of my copending application Ser. No. 756,058, filed Aug. 28, 1968 and now U.S. Pat. No. 3,528,444.

BACKGROUND OF INVENTION

This invention relates generally to fluidic digital control devices, and more particularly to a fluidic process controller acting in conjunction with a final control element in a process control loop to maintain a process variable at a desired level.

In a typical process control system, a fluid, which may be a liquid or a gas, is conducted through a control valve or final control element into a load. An electronic or pneumatic controller is a component in a process control loop which is subject to disturbances, the controller acting in conjunction with other devices to maintain a process variable at desired value. To accomplish this purpose, the controller receives both the designated value or set point and the process variable, the controller comparing the error therebetween and functioning to position a final control element which directly affects the process variable being controlled.

The variable controlled may be flow rate, temperature pressure, humidity, liquid level, viscosity, or any other process variable. Thus, in the case of a pneumatic controller, the input motion may be obtained from a rate-of-flow meter or rotometer whose reading is translated into a mechanical motion which is applied to the input lever of the controller. The pneumatic output of the controller may be impressed upon a flow-regulating valve operated by a pneumatic motor, which valve is opened or closed, or whose intermediate position is determined by the pneumatic controller. It is also possible to operate final control elements in other forms, such as variable-speed belt feeders and the like.

Automatic controllers are generally classified by the types of control action or the modes of control they provide. The modes most commonly used in controllers are proportional position, proportional plus reset, proportional plus rate, and proportional plus reset plus rate. In the proportional-position mode, the actuating signal applied to a pneumatic controller causes a change in output pressure proportional thereto. The degree of change in output pressure for a given change in actuating signals depends on the proportional band of the device. "Proportional band" is the range of the controlled variable which corresponds to the full operating range of the final control element. Reset action causes a change in output pressure proportional to the time integral of the actuating signal, whereas rate action causes the output pressure to vary as the rate of change of the actuating signal. Rate action is used in conjunction with proportional position and with proportional plus reset actions.

Electronic controllers carry out the same functions, but input and output values are electrical rather than pneumatic in character. While at present, pneumatic controllers are more widely used than electronic controllers, both have inherent advantages and drawbacks, so that the choice of a controller in a given situation often depends on whether the advantages outweigh the drawbacks.

Pneumatic controllers have certain obvious advantages over electronic controllers, for there are no circuits to be shorted, and maintenance personnel are in no danger of electrocution. Moreover, pneumatic controllers are inherently explosion proof and are more readily adapted to effect control in any one of the known operating modes. On the other hand, because they are composed of moving parts subject to wear and deterioration, pneumatic controllers have a limited life expectancy and suffer from hysteresis effects. Another drawback of pneumatic controllers is that they function as analog devices; hence when operating in conjunction with direct digital control (computer), it becomes necessary to include a relatively costly digital-to-analog converter to intercouple these units.

Since electronic controllers are solid-state devices without moving parts, they have a high order of reliability and a long life expectancy, provided the controller is protected from adverse factors in the environment of the installation. Because electronic controllers utilize digital circuits they may be directly coordinated with digital computer control systems. Such control has the advantage of a predictive control of the process variable, this advantage being lacking in analog control.

Despite the functional advantages of electronic controllers, limited use is made thereof, for maintenance and trouble shooting of such controllers call for skilled technicians and engineers whose services are costly and not always available. Electronic controllers are not explosionproof, and a failure of the controller in a process control system may have very serious consequences. Moreover, they are adversely affected by all liquids, corrosive and polluted environments, heat, electromagnetic interference, power supply surges, radiation, and other conditions which may be encountered in an industrial plant.

In my copending patent application, there is disclosed a fluidic digital controller in which the operating medium is a liquid or a gas, which fluidic controller possesses the advantages heretofore found in pneumatic and electronic controllers, but without the drawbacks incident thereto.

It is known that digital fluidics perform the same logic functions as electronic and other digital methods, and that digital theory is applicable to fluidic circuits. While fluidics cannot match electronics for speed, its speed is comparable to conventional hydraulics and pneumatics as well as to electromechanical relays; hence within the context of process control systems, the speed limitations of fluidics are not a material drawback. A fluidic controller is inherently explosionproof, the controller having no moving parts and being free of hysteresis and wear.

In the fluidic controller disclosed in my copending application, set point ($SP$) and process variable ($PV$) input signals are compared to produce a directional fluidic signal which depends on the relative level of the input signals, the directional signal being applied to the stages of a chain of reversible binary counters also supplied with clock pulses from a separate source. The chain only counts when a directional signal and a clock pulse are both present, the total count of the binary chain being converted into an analog pneumatic output signal proportional to the magnitude and sense of the error between the input $SP$ and $PV$ signals. This output signal serves to actuate the final control element to correct the error and, thereby, maintain $PV$ at a desired value.

While a fluidic controller of the type as set forth in my copending application is highly efficient and reliable as well as being superior in many respects to pneumatic and electronic controllers, it is a relatively complex and expensive device. In many situations, the need exists for a low-cost fluidic controller having operating characteristics which are satisfactory for the process control system in question, but which are well below those made possible by a controller of the type disclosed in my copending application.

SUMMARY OF INVENTION

Accordingly, it is the main object of this invention to provide a simple, low-cost fluidic controller which is adapted to compare an $SP$ signal with a $PV$ signal to produce, through digital means, a fluidic control signal serving to operate a signal control element for converting error between $PV$ and $SP$ and to maintain $PV$ at a desired level.

It is also an object of my invention to provide a fluidic controller which lends itself to operation in conjunction with electronic controllers.

Among the significant features of a fluidic digital controller in accordance with the invention are a degree of reliability and life expectancy exceeding both electronic and pneumatic devices, and the fact that the fluidic controller, which is unaffected by environmental factors, is virtually maintenance free and completely safe. An important advantage incident to fluidics is the elimination of downtime due to failure. For industrial and chemical processing, the cost of such downtime far exceeds the cost of the components in the process control system.

A fluidic controller is not influenced by severe industrial conditions such as high temperature, corrosion, shock, vibration, radiation and dust. It is simple to install, tune and start up and it may be serviced and maintained by nonskilled technical personnel.

Briefly stated, a fluidic controller in accordance with the invention, comprises a comparator to which is applied a fluidic input analog pressure signal $SP$ and a fluidic input analog pressure signal $PV$. The comparator includes a Schmitt trigger circuit responsive to these input signals to produce an output signal which responds only on whether $PV$ is lower or higher than $SP$ and is at a constant pressure level, whereby when the value of $PV$ varies periodically with respect to $SP$, the trigger output is a square wave.

The output from the trigger circuit is amplified and integrated to produce a control signal which is applied to the final control element of the process system, which element functions to vary $PV$ in a direction reducing its difference with $SP$ but causing $PV$ to slightly overshoot $SP$ before reversing direction, each overshoot and reversal causing the trigger circuit to produce a square wave pulse. The signal acts to regulate the final control element to maintain $PV$ at the desired level.

BRIEF DESCRIPTION OF DRAWING

For a better understanding of the invention as well as other objects and further features thereof, reference is made to the following detailed description to be read in conjunction with the annexed drawing, wherein:

FIG. 1 is a block diagram of a process control loop, including a fluidic digital controller in accordance with the invention;

FIG. 2 is a block diagram of the controller;

FIG. 3 is a schematic diagram of the comparator circuit included in the controller;

FIG. 4 is a graph explanatory of the effect of the controller on the pressure variable;

FIG. 5 is a graph showing the square wave output of the trigger circuit included in the controller;

FIG. 6 shows the response curve of the controller;

FIG. 7 shows the controller arrangement when operating a differential actuator in the final control element; and FIG. 8 is a block diagram of the controller when supplying signals to a computer associated therewith.

DESCRIPTION OF INVENTION

The Process Control Loop

Referring now to FIG. 1, there is shown a basic process control system in accordance with the invention, for regulating the flow of a fluid (liquid or gas) or flowable solids in particulate form. By way of example, we shall assume that flowing through line 10 is a gas which is fed to a process through a final control element 11, which may be opened and closed to start and stop the flow, the element being adjustable to intermediate values between the open and closed states to vary the flow. For this purpose, final control element 11 may take the form of an air-operated proportional flow control valve operated by a diaphragm or cylinder actuator 12.

In a typical valve actuator, the input air pressure signal is usually in the range of 3–15 p.s.i., the flow through the valve being rendered proportional to the pressure signal. If, therefore, a pressure of 3 p.s.i. corresponds to a closed valve state, a pressure of 15 p.s.i. is the fully open state, and a pressure of 9 p.s.i., is 50 percent open, etc. Thus, by varying the intensity of pressure signal to actuator 12, one may vary the flow through valve 11 accordingly.

Process controller 13, which is a fluidic device in accordance with the invention, serves to maintain the flow through line 10 at the desired level. To accomplish this purpose, controller 13 compares the desired value or set point signal and signal corresponding to the process variable, to provide a control signal for operating the final control element 11. The set point signal (3–15 p.s.i.) may be obtained from a manually operated remote set point source 14, or a digital computer 15, in which even an electric-fluidic interface 16 and a fluidic-electric interface 17 are provided to couple the controller thereto. The nature of computer control will be discussed later in detail.

The process feedback signal (3–15 p.s.i.), corresponding to the actual flow through process line 10 is obtained from a differential-pressure meter 18 or equivalent means coupled to an orifice plate 19 in the line. Controller 13, which includes a comparator to compare the set point to the process variable, produces a control signal that is proportional to the difference or error therebetween.

If the set point signal is higher than the feedback signal, process controller 13 will send a control signal to the final control element 11, causing it to open to an extent increasing the flow rate to restore the flow rate to its desired level. Conversely, if the set point signal is lower than the feedback signal, the controller will direct the final control element to decrease the flow rate to an extent restoring the flow rate to its desired value.

The control loop, as described above, is essentially the same as that used in a pneumatic control system, except that in the present invention the controller is a fluidic digital device and not an analog pneumatic device. Digital theory is well established and is fully applicable to fluidic circuits. The three principal fluidic devices are the jet interaction amplifier, the flow mode turbulence amplifier, and the focused jet amplifier.

As indicated in the article, "Digital Fluids Works Now," by Henke, in CONTROL ENGINEERING for Jan. 1967, and in the references cited therein, fluidic devices are adapted to carry out logic functions, such as OR, AND and NOR. Fluidic logic gates can be built into the familiar digital circuits normally associated with electronics, such as Schmitt-trigger circuits, binary counters and shift registers.

Where, for example, the fluid being governed by the controller is of such a nature that the same fluid is useable in the controller, it is not necessary to have a separate fluid supply therefor. Thus, if natural gas is flowing through line 10, one may dispense with an independent fluid supply for the controller. In this instance, one may also dispense with a sensor or transmitter to derive $PV$ from line 10 and, instead, as shown by the variable fluidic resistor 20, derive $PV$ directly from the natural gas line.

If the value of fluidic resistance introduced by resistor 20 is such as to provide a ratio of input to output fluid velocity in which the output lies in the sonic range, then the flow in the output of the resistor, which acts essentially as a fluid constriction, will be proportional to the input pressure and hence will provide a PV signal without the need for a transducer or sensor.

Similarly, instead of a separate set point station, one may derive set point pressure by means of a conventional pressure regulator 21, coupled directly to line 10, the regulator being adjustable to provide a pressure output at a constant level in the 3–15 p.s.i. range. Supply for the controller may also be obtained by means of a regulator (not shown) coupled to line 10, the output of the regulator being filtered to supply clean, dry gas at 35 p.s.i. or whatever level is dictated by the pressure requirements of the system.

It is to be understood that, in dealing with a fluidic system, equivalent electrical terms are used for fluidic circuit elements. In practice, fluidic resistances are devices such as valves or variable openings which act to reduce the fluidic input signals to levels compatible with the comparator components. On the other hand, while the invention is disclosed herein in conjunction with a fluidic system, the same principles are fully applicable to an electronic controller, and one may provide an electronic controller with a comparator having a trigger circuit, as disclosed herein, to effect a controlling action having distinct advantages over existing electronic controllers.

Fluidic Process Controller

Referring now to FIG. 2, the essential components of fluidic controller 13 are illustrated in block form. Controller 13 is constituted by a comparator 22 whose outputs are fed to a dual channel digital amplifier 23. Applied to the two inputs of comparator 22 are pressure variable $PV$ signal and the set point $SP$ signal. The $PV$ signal is derived from variable resistor 20 coupled to line 10 whose fluid is being controlled.

As pointed out in the previous section, $PV$ may alternatively be taken from a sensor coupled to the line or any other known means. Signal $SP$ is taken from regulator 21 coupled to line 10, or it may be derived from a fluidic set point station of known design. In practice, the pressure range for $PV$ and $SP$ is 3–15 p.s.i.

As shown separately in FIG. 3, comparator 22 is a fluidic circuit so responsive to the relative levels of $SP$ and $PV$ as to produce a first fluidic output at a constant pressure level when $SP>SP>PV$ and a second fluidic output, also at a constant pressure, when $PV>PV>SP$. This is accomplished by three stages of proportional fluidic amplifiers $A_1$, $A_2$, and $A_3$ in cascade relation, the output of the final stage being fed to a trigger stage $T$, flip-flop, OR gate, or both. All stages include two input terminals $i_1$ and $i_2$ and two output terminals $o_1$ and $o_2$. The invention is by no means limited to three amplifier stages and, in practice, a smaller or greater number may be used.

The $PV$ and $SP$ signals are applied to input terminals $i_1$ and $i_2$, respectively, of first amplifier stage $A_1$. By way of example, we shall assume that $SP$ is greater than $PV$ by a certain degree. As a consequence, fluid at relatively high pressure from a fluid pressure source $P_S$ is diverted in the first stage $A_1$ to a greater extent toward the output $o_1$ thereof, and the fluid pressure at this output relative to that at output $o_2$ is proportional to the difference between the input $SP$ and $PV$ values.

Thus, the fluid input pressure at terminal $i_1$ of second amplifier stage $A_2$ which is coupled to output $o_1$ of amplifier $A_1$, is greater than that at the input terminal $i_2$, which is coupled to output $o_2$ of amplifier $A_1$, and, as a result, the output at terminal $o_2$ of stage $A_2$ is proportionally greater than at $o_1$. In amplifier stage $A_3$, the input at $i_2$ is therefore greater than at $i_1$, and the output at $o_1$ is proportionally greater than that at $o_2$. The fluidic outputs appearing at terminals $o_1$ and $o_2$ of amplifier stage $A_3$ are applied to inputs $i_1$ and $i_2$ of trigger stage $T$.

Trigger stage $T$, which may be fluidic flip-flop, OR gate, or both, or any fluidic device behaving in an equivalent manner, is adapted to produce a fluidic output at either of output terminals $o_1$ or $o_2$, at a constant pressure level. The operative output terminal is determined by the relative pressure levels at input terminals $i_1$ and $i_2$. If the pressure at terminal $i_1$ of trigger stage T is greater than at $i_2$, and in the example given it is, by reason of the fact that $SP>SP>PV$, then the trigger will yield an output solely at $o_1$. The reverse operation occurs when $PV$ is greater than $SP$, in which event a constant output pressure appears only at terminal $o_2$.

If, therefore, the value of $PV$ periodically rises and falls relative to $SP$, which is at a fixed reference level, a square wave will appear at output $o_2$ of the trigger, the leading edge of each pulse coinciding with the instant $PV$ rises above $SP$, and the trailing edge coinciding with the instant $PV$ thereafter falls below $SP$. The width of the square pulse is determined by the time interval between the leading and trailing edges. At output $o_1$, a square wave will also appear, but 180° out of phase with that at $o_2$.

In other words, the trigger stage $T$ flips when $PV$ becomes greater than $SP$, and flops when it drops below $SP$, the output of the trigger being at a constant pressure level which is independent of the degree of difference between $SP$ and $PV$.

Returning now to FIG. 2, it will be seen that the square wave outputs of comparator 22 are applied to digital amplifier 23, one of whose outputs $OUT_1$ is proportional to the output $o_1$ of the comparator and appears only when $SP>SP>PV$, the other output $OUT_2$ being proportional to the output $o_2$ of the comparator and appearing only when $PV>PV>SP$.

A portion of the output developed at terminal $OUT_1$ is fed back through a variable feedback resistor 24 to the $PV$ input of comparator 22. The value $PV$ derived from line 10 is fed into the same input through a diode 25 which is unidirectional flow device preventing the feedback fluid from going anywhere but into the comparator.

Thus, the input to the comparator is the algebraic sum of $PV+Kf_BK$ is a constant and $f_B$, the pressure level of feedback. This feedback acts to stabilize the system by reason of its damping effect, the degree of feedback determining the damping factor.

Output $OUT_1$ of digital amplifier 23 is applied by way of a diode-resistance network formed by diodes 26 and 27 and resistors 28 and 29, to actuator 12 for the final control element 11, which, in practice, may be a fluid-operated proportional-flow control valve operated by a diaphragm actuator. In the network, diode 26 permits unidirectional flow from output $OUT_1$, to actuator 12 through resistor 28, whereas diode 27 only permits backflow from actuator 12 to output $OUT_1$ through resistor 29. In the embodiment shown in FIG. 2, the output $OUT_2$ is vented and hence no use is made thereof.

Operation Of Controller

In analyzing the behavior of the controller, we shall first assume, as shown graphically in FIG. 4, that the set point $SP$ for the system is set at 9 p.s.i., whereas initially $PV$ is at 3 p.s.i., the lowest level in the p.s.i. range which extends to 15 p.s.i. Hence, the task assigned to the controller is to so operate the final control element as to cause $PV$ to rise to 9 p.s.i. and, thereafter, to maintain $PV$ at this level.

When $SP$ is greater than $PV$, a constant fluid pressure appears at output $OUT_1$ of digital amplifier 23, and is fed through diode 26 and resistor 28 to diaphragm actuator 12 of the final control element. This output is integrated in the actuator or by the conduit leading thereto to produce a control signal, causing increased opening of valve 11 and a consequent rise in $PV$. This rise in $PV$, with time, is shown in FIG. 4, wherein the interval $\Delta t$, $PV$ rises from 3 p.s.i. to 9 p.s.i., which is the set point level.

But, the inherent mechanical inertia of the process control system is such that even after actuating pressure is cut off, and this occurs when $PV$ crosses over the level of $SP$ thereby causing the comparator to switch from output $OUT_1$ to output $OUT_2$, which is vented, the value of $PV$ continues to increase for a finite period. In a practical embodiment of the system, $PV$ reaches a level of 0.01 p.s.i. above the set point value before reversal occurs.

When comparator 22 detects a condition in which $PV$ exceeds $SP$, its trigger circuit operates to switch the output to $OUT_2$, and the pressure applied by output $OUT_1$ to the actuator diaphragm, is released. Consequently, as the unpressured diaphragm then proceeds to reverse direction, the back pressure produced thereby flows through diode 27 and resistor 29, until a point is reached where the value $PV$ created by this action crosses over the $SP$ level (FIG. 4) and trigger $T$ is again switched to produce fluid pressure at $OUT_1$, causing $PV$ to again rise and to repeat the cycle.

The resultant reciprocation of $PV$ about the $SP$ level produces the sawtooth wave train $SW_1$ shown in FIG. 4, but, because of the damping action created by the feedback loop, the excursion of the sawtooth wave is stabilized to produce a steady train $SW_2$ of reduced amplitude. Thus, the oscillation of $PV$ with respect to $SP$ is within a relatively narrow band whose span is determined by the damping factor.

In the graph of FIG. 5, showing the output of terminal $OUT_1$ of the digital amplifier during the changing course of $PV$ in FIG. 4, it will be seen that, in the interval $\Delta t$, when $PV$ is rising to the level of $SP$, the pressure level at terminal $OUT_1$ of the digital amplifier is constant, but when PV thereafter proceeds to swing back and forth, within a relatively narrow band with respect to SP, square wave pulses are produced at corresponding positions in time, Thus, every time the set point SP is changed to a new value, there is a brief interval during which the output of the digital amplifier is constant and in the course of which the value of PV varies to approach the SP level, this action being followed by a minute oscillation of the PV value when the SP level is reached.

This modulation component which constitutes a dithering action, occurs at a relatively rapid rate and has an imperceptible effect on the fluid being controlled, for the square wave pulses from the digital amplifier are effectively integrated by the diaphragm actuator or in the conduit leading thereto. However, this dithering action has an important effect, for it tends to prevent the valve stem form sticking, and to reduce friction of the valve packing, thereby keeping the valve free.

Unlike conventional controllers, the controller in accordance with the invention is capable of compensating for unsymmetrical process response. As is well known, some processes require a faster response for positive correction and a slower response for negative correction. The response time for positive correction is determined by the value of resistor 28, and that for negative correction by the value of resistor 29, which value may be separately adjusted to provide different response times. The damping factor is adjustable by varying feedback resistor 24.

In FIG. 6, there is shown a typical response curve for a fluidic controller of the type described above. In this graph, curve CO is the computed control output with analog pressure applied to the process actuator in the 3 p.s.i. to 5 p.s.i. range. It will be seen that when set point SP is suddenly stepped up to a higher level, the value of PV rises along a ramp, and the value PV rises PV a parallel ramp until it reaches a point approaching SP. The degree of dithering in the CO output depends on the damping of the system. A similar effect is obtained when SP is abruptly reduced.

Double-Acting Controller

When, as shown in FIG. 7, the actuator 12 for the final control element 11 is of the double-acting rather than of the single-acting type, use is made of both outputs of the digital amplifier 23. In this instance, output $OUT_1$ is supplied to the upper chamber of actuator 12, through resistor 28, while output $OUT_1$ is supplied to the lower chamber thereof, through resistor 29, so that the action is positive in both directions of movement.

Thus, the need for a diode network is obviated. In all other respects, the operation is the same as that previously described.

Computer Operation

In effecting direct digital control (DDC) by means of an electronic computer 15, as shown in FIG. 1, the output of the computer is fed directly to the fluidic controller without expensive signal conversion and conditioning. This may be carried out by existing electric-to-fluidic interface devices (device 16 in FIG. 1) such as the Electro-Fluidic Transducer Model 6040 manufactured by Pitney-Bowes. These interfaces may be located at the plant interface so that only fluidic components and no electrical components appear in the plant environment.

Fluidic signals can also be converted to electrical signals (device 17) with existing compatible interface devices such as Pressure-electric Switch Model PSF-100A, made by Fairchild Controls, a Division of Fairchild Camera and Instrument Corporation.

As shown in FIG. 8, in the dual output of the digital amplifier, we have an output $OUT_1$ which in its modulation component indicates a condition of Process Status High (PSH), wherein PV is above SP (1 p.s.i. is logic "one," and less than 0.05 p.s.i. is logic "zero"). In output $OUT_2$ we have a modulation component indicating Process Status Low (PSL) wherein PV is below SP (1 p.s.i. is logic "one," and less than 0.05 p.s.i. is logic "zero"). These indications may be sent to the computer to provide data as to the existing status of the process, whereby the computer can then carry out correction functions.

While there have been shown preferred embodiments of the invention, it will be appreciated that many changes and modifications may be made therein without departing from the essential concepts underlying the invention. The comparator, for example, may incorporate a Schmitt trigger 190462 manufactured by the Fluidic Products Department of the Corning Glass Works. This trigger is a pneumatic switch with an adjustable trigger point, and is therefore an analog to a digital device. It utilizes three proportional amplifiers, a flip-flop and a NOR gate in one monolithic block consisting of five plates. The other elements of the system, including the digital amplifier, may also be in the form of integrated circuit modules, thereby avoiding the need for connecting tubing separate fluidic components, so that the entire controller may be fabricated in the form of a highly compact assembly of integrated structures.

I claim:

1. A fluidic controller responsive to process variable (PV) and set point (SP) signals produced in a process control system having a final control element to vary the process in order to maintain the process variable at a desired level, said controller comprising:
    A. a comparator including a trigger stage responsive to the relative levels of said SP and PV signals to produce in a first output a signal of constant level when SP>SP>PV, and to produce in a second output a signal of constant level when PV>PV>SP, whereby when the value of PV oscillates with respect to SP, each output is a square wave,
    B. integration means coupled to at least one of the outputs of said trigger stage to integrate the signal yielded thereby to produce a control signal, and
    C. means coupled to said integration means to apply said control signal to said final control element to cause said element to vary PV in a direction approaching SP, said control element having an inherent inertia causing PV to oscillate with respect to the value of SP, within a relatively narrow band.

2. A controller as set forth in claim 1, further including a feedback path between said one output and the input of said comparator to which PV is applied, to produce feedback to an extent stabilizing the controller.

3. A controller as set forth in claim 1, wherein said signals are fluidic and said comparator is a fluidic Schmitt trigger.

4. A controller as set forth in claim 3, wherein said comparator is constituted by a series of fluidic proportional amplifier stages whose first stage is responsive to said fluidic SP and PV signals, the last stage being coupled to the input of said fluidic trigger.

5. A controller as set forth in claim 3, wherein said final control element is interposed in a line conducting a fluid to a load, and wherein PV is derived from a resistor coupled to said line, and SP is derived from a pressure regulator coupled to said line.

6. A controller as set forth in claim 3, wherein said final control element includes a single-ended pneumatic actuator, and further including a first diode in series with a resistor unidirectionally coupling said one output to said actuator, and a second diode in series with another resistor unidirectionally coupling said actuator to said one output, the second output being vented.

7. A controller as set forth in claim 3, wherein said final control element includes a double-ended pneumatic actuator, one end being coupled to said one output, the other end being coupled to said second output.

8. A controller as set forth in claim 3, wherein said comparator includes a digital amplifier coupled to the output of said trigger stage.

9. A controller as set forth in claim 3, further including a feedback resistor connected between said one output of the trigger stage and the *PV* input of the comparator, whereby the input signal thereto is the sum of the *PV* and the feedback signal.

10. A controller as set forth in claim 9, wherein said feedback resistor is adjustable to vary the damping of the controller.

11. A fluidic controller adapted to govern a final control element in a process control system so as to maintain a process variable at a level determined by set point value, said controller comprising:

A. a fluidic comparator including a trigger stage for comparing a fluidic signal proportional to said process variable with a set point signal proportional to said set point value to produce an output signal of constant level when the relative amplitudes of the process variable and set point signals are different and to produce an output signal which is a square wave when the process variable signal oscillates with respect to the set point signal, the frequency of said square wave being determined by the rate of said oscillation, B. integration means coupled to said comparator to integrate said output signal to produce a control signal, and C. means coupled to said integration means to apply said control signal to said final control element to cause said element to vary the process variable in a direction approaching the set point value, said control element having an inherent causing the process variable and the fluidic signal proportional thereto to oscillate with respect to the set point value within a relatively narrow band.

UNITED STATES PATENT OFFICE
CERTIFICATE OF CORRECTION

Patent No. 3,608,572          Dated   September 28, 1971

Inventor(s)   Hyman Hass

It is certified that error appears in the above-identified patent and that said Letters Patent are hereby corrected as shown below:

Column 2, line 67, "signal" should have read -- final --
Column 3, line 17, "responds" should have read -- depends --
Column 4, line 9, "even" should have read -- event --
Column 6, line 14, after "PV+Kf$_B$" " there should have appeared the word --where-- before "K"
Column 7, line 16, "form" should be -- from --
Column 7, line 34, "PV a parallel ramp" should have read --along a parallel ramp --
Column 7, line 45, "OUT$_1$" should have read -- OUT$_2$ --
Column 8, line 16, after "tubing" should have appeared -- between --
Column 10, third line from end, after "inherent" there should have appeared --inertia --

Signed and sealed this 4th day of April 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,608,572      Dated September 28, 1971

Inventor(s)    Hyman Hass

It is certified that error appears in the above-identified patent and that said Letters Patent are hereby corrected as shown below:

Column 8, Claim 1 , under (A), third line, the first "SP >." should not have been printed under (A), fifth line, the first PV > ", should not have been printed Signed and sealed this 6th day of June 1972.

(SEAL)
Attest:

EDWARD M. FLETCHER, JR.
Attesting Officer

ROBERT GOTTSCHALK
Commissioner of Patents